(12) United States Patent
Schreiber

(10) Patent No.: US 7,957,100 B1
(45) Date of Patent: Jun. 7, 2011

(54) DISK DRIVE GIMBAL HAVING REDUCED RESIDUAL STRESS AND RELATED METHOD OF MANUFACTURE

(75) Inventor: Christopher Mark Schreiber, Lake Elsinore, CA (US)

(73) Assignee: Magnecomp Corporation, Murrieta, CA (US)

( * ) Notice: Subject to any disclaimer, the term of this patent is extended or adjusted under 35 U.S.C. 154(b) by 951 days.

(21) Appl. No.: 11/846,683

(22) Filed: Aug. 29, 2007

(51) Int. Cl.
 *G11B 5/48* (2006.01)
(52) U.S. Cl. .................................. 360/245.3; 360/245.8
(58) Field of Classification Search ............... 360/245.3, 360/245.8, 245.9
See application file for complete search history.

(56) References Cited

U.S. PATENT DOCUMENTS

| | | | |
|---|---|---|---|
| 4,728,751 A | 3/1988 | Canestaro et al. | |
| 5,228,324 A | 7/1993 | Frackiewicz et al. | |
| 5,588,200 A | 12/1996 | Schudel | |
| 5,805,382 A * | 9/1998 | Lee et al. | 360/244.1 |
| 6,249,404 B1 * | 6/2001 | Doundakov et al. | 360/245.4 |
| 6,351,351 B1 * | 2/2002 | Takasugi | 360/245.9 |
| 6,617,510 B2 | 9/2003 | Schreiber et al. | |
| 6,697,228 B1 | 2/2004 | Mei et al. | |
| 7,271,985 B1 * | 9/2007 | Buhler et al. | 360/245.9 |
| 7,532,438 B1 * | 5/2009 | Mei et al. | 360/245.8 |
| 7,826,177 B1 * | 11/2010 | Zhang et al. | 360/245.3 |
| 2005/0280944 A1 * | 12/2005 | Yang et al. | 360/245.9 |
| 2009/0067096 A1 * | 3/2009 | Bonin | 360/245.3 |

OTHER PUBLICATIONS

'Thermal Softening and Stress Relaxation in Copper', http://products.asminternational.org/asm/CONTENT/MH/D12/A06/S0078810, Mar. 22, 2006.
'Material Properties of CIS', Oct. 23, 2002.
'High Strength High Conductivity Copper Alloy, NK120 (C18145)', Aug. 1, 2006.
'TSA Laminate Properties for Oct. 20, 2012 Material', Sep. 2003.

* cited by examiner

*Primary Examiner* — Jefferson Evans
(74) *Attorney, Agent, or Firm* — Intellectual Property Law Offices of Joel Voelzke, APC

(57) ABSTRACT

A disk drive gimbal, an apparatus, and a related method of manufacture, wherein the disk drive gimbal includes a strut having a trace with a zig-zag shape. The trace is made from conducting material, and the zig-zag shape is configured to provide a level of stress relief to the conducting material that is included in the trace.

29 Claims, 12 Drawing Sheets

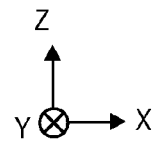

DISK DRIVE GIMBAL HAVING REDUCED RESIDUAL STRESS AND RELATED METHOD OF MANUFACTURE

FIELD OF THE INVENTION

The invention relates generally to the field of disk drive suspensions. More specifically, the invention relates to gimbals that are configured to be included in disk drive suspensions and provide a stable pitch static attitude ("PSA") due to residual stress relief, and a related method of manufacture.

BACKGROUND

Suspensions for suspending sliders in hard disk drives are well known in the art. Referring to FIG. 1, in a typical hard disk drive, the disk drive's read-write transducer 10 is included in, or mounted to, a slider 12. The slider has an aerodynamic design and is supported by a suspension 14. The slider's aerodynamic design allows for airflow between the slider and the disk drive's spinning disk 16. This airflow generates lift, which allows the read-write transducer to fly above the spinning disk's surface 18 at an optimal distance for reading data from, or writing data to, the disk.

Referring additionally to FIG. 2, which is a simplified partial side elevational view of the slider and a distal end 20 of the suspension 14, a typical suspension includes a gimbal 22 at the suspension's distal end, and a load beam 24. The gimbal typically is bonded to the load beam by laser welding or adhesive bonding. Typically, the load beam is formed from stainless steel ("SST") foil and includes a spring portion 30 that applies a loading force, also known as a "pre-load" or "gram force," to the slider 12. The pre-load force counteracts the lift that is generated by the airflow between the slider and the spinning disk 16, and brings the slider into a predetermined close spacing to the disk surface 18 while the disk is spinning. A proximal end 32 of the load beam is coupled to a baseplate and subsequently an actuator arm 34. The actuator arm moves under motor control to precisely position the slider, and thus, the disk drive's read-write transducer 10 relative to the disk surface.

As shown in FIG. 2, the gimbal 22 supports the slider 12. In particular, a top surface 36 of the slider is coupled to a tongue-shaped part (also referred to as a "tongue") 38 of the gimbal, for example, using an adhesive bond. The distal end 40 of the load beam 24 includes a hemispherical projection (also referred to as a "dimple") 42 against which the tongue of the gimbal rests after the gimbal is connected to the load beam. The gimbal, in combination with the load beam's dimple, allows the slider to pitch and roll in response to changes in airflow between the slider and the disk drive's spinning disk 16 that result from irregularities in the disk's surface 18, and to changes in the velocity of the air that is induced by the spinning disk, typically referred to as windage.

Referring additionally to FIGS. 3, 4, and 5, the gimbal 22 includes two struts (also known as "outrigger struts") 44 and 46 that couple the gimbal's tongue 38 to the gimbal's proximal end 48, which, in turn, couples to the load beam 24. The strut includes the following three layers: a supporting layer 50, a conducting layer 52, and an insulating layer 54, which is coupled between the supporting layer and the conducting layer. The combination of the conducting layer, the insulating layer, and the supporting layer form a microstrip transmission line configuration. FIG. 5 illustrates the fact that the height of the conducting layer ("$H_{CL}$"), the height of the insulating layer ("$H_{IL}$"), and the height of the supporting layer ("$H_{SL}$") remain constant along the length of the strut.

The supporting layer 50 is configured to provide mechanical support for the insulating layer 54 and the conducting layer 52. Typically, the supporting layer is made of a supporting material, e.g., stainless steel ("SST"), the insulating layer (also referred to as a "dielectric layer") is made of an insulating material, e.g., polyimide, and the conducting layer is made of a conducting material, e.g., copper or an alloy thereof. The conducting material is formed into traces 56 that are configured to be coupled to electrical leads (not shown), which interface with the slider's read-write transducer 10. An overlay layer 58, e.g., a low-temperature, modified, acrylic insulation film or a photosensitive resin, can cover the conducting layer, electrically insulating the conducting layer's traces from one another, and inhibiting corrosion of the conducting material. As shown in FIGS. 4 and 5, the overlay layer has a height ("$H_{OL}$"), which when combined with the height of the conducting ("$H_{CL}$"), the height of the insulating layer ("$H_{IL}$"), and the height of the supporting layer ("$H_{SL}$") equal the height of the strut ("$H_S$").

If the conducting layer 52 is made of a copper alloy, the conducting layer typically is formed by cold rolling, which is a process that is known to individuals having ordinary skill in the art. After the conducting layer is cold rolled onto the insulating layer 54, the conducting layer is processed to form traces 56 by subtractive chemical milling, e.g., chemical etching. An increasingly popular method for manufacturing conducting layers formed from pure copper is through additive manufacturing methods, e.g., circuit integrated suspension ("CIS") technology or Additive Circuit Gimbal ("ACG") technology, in which the conducting layer traces are created by depositing, e.g., plating or electrodepositing, pure copper onto the insulating layer. ACG technology provides some advantages over traditional manufacturing methods, e.g., cold rolling copper alloy, in terms of the capability to generate smaller spacing between traces, which results in a smaller pitch, i.e., the distance between the centers of adjacent traces, and offers higher resolution and improved design density and functionality. Pure copper is considered by individuals having ordinary skill in the art to be greater than or equal to 99.5% copper.

Typically, the gimbal 22 is secured to the load beam 24 by spot welding the proximal end 48 of the gimbal to the load beam's bottom surface 60. After welding the gimbal to the load beam, the gimbal has to satisfy various mechanical requirements (also referred to as "mechanical characteristics") such as stiffness and geometrical requirements in terms of angles (pitch and roll angles for different axes of rotation). The main factor that influences the mechanical requirements of the gimbal is the supporting material, followed by the conducting material. In comparison to the supporting material and the conducting material, the insulating material has very little influence on the mechanical requirements of the gimbal. The geometric requirements, e.g., the pitch and roll angles, are met by adjusting the gimbal at specified locations through either mechanical processes, which are discussed below, or laser adjust processes, both of which are known to individuals having ordinary skill in the art (See the following U.S. patents, which are incorporated by reference herein: U.S. Pat. No. 5,588,200 to Schudel, and U.S. Pat. No. 6,697,228 to Mei et al.).

During operation of the disk drive, the gimbal's tongue 38 supports the slider 12 in a spaced relation to the disk surface 18. It is desirable for the slider to be oriented roughly parallel to the surface of the spinning disk 16, even if the slider is in an unloaded position, i.e., the slider has been pulled away from the surface of the disk and is no longer flying above the spinning disk. If the slider is not oriented roughly parallel to the disk surface, the slider may contact the surface of the disk when the slider is loaded into its flying position. As improvements are made in computer disk drive technology, disk drive sliders are being designed to fly closer to disk surfaces, and thus, the relative orientation of sliders to the disk surfaces becomes even more critical.

A slider's 12 orientation relative to the disk surface 18 is dependent upon the pitch static attitude ("PSA") of the suspension 14. To ensure proper orientation, a suspension, or a portion of the suspension, e.g., the gimbal 22, is adjusted during manufacturing so that the gimbal's tongue 38 is approximately parallel to the expected plane of the disk surface. This adjustment, which is referred to as the pitch static attitude adjustment ("PSA adjustment"), is required when the PSA of the suspension after the connection of the gimbal to the load beam 24 is different from a target value.

In general, a PSA adjustment of a gimbal 22 includes bending and/or twisting the gimbal to bring the gimbal's tongue 38 into the desired orientation. More specifically, adjustment of the suspension's final PSA is accomplished by micro-bending the suspension assembly 14 including the gimbal. For example, the PSA adjustment of a gimbal can be facilitated by attaching a pair of clamps to each strut 44 and 46 of the gimbal, and using the clamps to move, e.g., bend and/or twist, the gimbal so the tongue is brought into the desired orientation relative to the expected plane of the disk surface 18. If a PSA adjustment is not performed on the gimbal, the gimbal's tongue may not be oriented parallel to the disk surface, and there is a higher likelihood that an edge 62 or corner 64 of the slider 12 will contact and damage the disk surface. More precise thermal adjustment methods using lasers and other infrared ("IR") sources to micro-bend materials have been developed, as discussed in U.S. Pat. No. 5,228,324 to Frackiewicz et al. and U.S. Pat. No. 5,588,200 to Schudel, which are incorporated by reference herein. Current volume production product posses a greater than 1.5 cpk at +/−0.35° PSA for both pitch and roll characteristics.

One observation that is related to the transition from subtractive processes, which use a copper alloy, to additive processes, which use pure copper, is that the shape of the suspension 14 after the PSA adjustment process slowly reverts to its original configuration, i.e., the suspension's shape prior to the PSA adjustment process, due to the inherent creep in the pure copper. The copper that is used in the additive processes has significantly lower creep resistance in comparison to the harder, stronger copper alloy that is used in the subtractive processes. The copper alloy has a higher resistance to creep because of its composition. The lower creep resistance of pure copper leads to longer settling times after the suspension is formed. This happens because the soft pure copper creeps for many hours or days after the bending that is performed as part of the PSA adjustment process, and before the copper reaches its new equilibrium state.

The longer settling time for pure copper leads to manufacturing throughput issues and larger variations in the final adjusted roll static attitude ("RSA"), pitch static attitude ("PSA"), and gram load values. The creep resistance of a material is proportional to the tensile strength of the material. The yield strength of plated pure copper after normal additive circuit processing is 90-100 MPa, which is significantly less than the yield strength (greater than 500 MPa) of the alloy copper that is used in subtractive processes.

It should, therefore, be appreciated that there is a need for a disk drive suspension 14 that includes a gimbal 22 having a plated or electrodeposited conducting layer 52 with minimal creep. The present invention satisfies these needs.

SUMMARY

Embodiments of the present invention include a gimbal, an apparatus, and a related method for manufacture, which offer a level of stress relief, and thus, provide reduced creep. An exemplary embodiment of the invention is a disk drive gimbal that includes a strut having a trace with a zig-zag shape.

In other, more detailed features of the invention, the trace includes a plurality of zig-zag corrugations, the strut has a stiffness, and the stiffness of the strut with the trace having the plurality of zig-zag corrugations is greater than if the trace did not include the plurality of zig-zag corrugation. The plurality of zig-zag corrugations can have an orientation along an axis, and the stiffness of the strut with the trace having the plurality of zig-zag corrugations can be greater than if the trace did not include the plurality of corrugations in a direction that is parallel to the axis of orientation of the plurality of zig-zag corrugations.

In other, more detailed features of the invention, the trace is made of a conducting material, and the zig-zag shape is configured to provide a level of stress relief to the conducting material that is included in the trace. Also, the trace can have a height from approximately 5 µm to approximately 20 µm, and a width from approximately 10 µm to approximately 100 µm.

In other, more detailed features of the invention, the trace includes a section that has a shape that is straight, angled, or curved. Also, the trace can have a width, and the trace's zig-zag shape can include a repetitive oscillatory shape that can be characterized as having a wavelength from approximately one half the width of the trace to approximately four times the width of the trace. In addition, the strut can further include an insulating layer having a surface and a maximum thickness. The trace can be coupled to the insulating layer's surface. The trace's zig-zag shape can include a repetitive oscillatory shape that can be characterized as having an amplitude from approximately one third of the insulating layer's maximum thickness to approximately three fourths of the insulating layer's maximum thickness.

In other, more detailed features of the invention, the strut further includes an insulating layer having a first surface, and a conducting layer that includes the trace and is coupled to the insulating layer's first surface. Also, the insulating layer can have a second surface, and the strut can further include a supporting layer that is coupled to the insulating layer's second surface. In addition, the conducting layer can be made of deposited copper or an alloy thereof; the insulating layer can be made of polyimide; and the supporting layer can be made of stainless steel.

In other, more detailed features of the invention, the strut includes a plurality of traces, and at least one of the plurality of traces has the zig-zag shape. Each of the plurality of traces has a width, and the plurality of traces can be separated from one another by a distance from approximately the width of the trace to approximately twice the width of the trace.

Another exemplary embodiment of the invention is an apparatus that includes a trace made of a conducting material, where the trace has a zig-zag shape that is configured to provide a level of stress relief to the conducting material that is included in the trace. In other, more detailed features of the invention, the apparatus further includes an insulating layer having a surface, where the trace is coupled to the insulating layer's surface.

An exemplary method according to the invention is a method for forming an apparatus. The method includes providing an insulating material and a conducting material, forming an insulating layer from the insulating material, and forming a trace from the conducting material. The trace is coupled to the insulating layer, and the trace has a zig-zag shape that is configured to provide a level of stress relief to the conducting material that is included in the trace.

In other, more detailed features of the invention, the insulating layer has a first surface. The method further includes forming a plurality of depressions in the insulating layer's first surface before the step of forming the trace from the conducting material. The step of forming the trace from the conducting material includes depositing the conducting material into the plurality of depressions. Also, the plurality of depressions in the insulating layer can be formed by removing portions of the insulating material from the first surface of the insulating layer.

In other, more detailed features of the invention, the method further includes providing a seed material, and forming a seed layer from the seed material after the step of forming the insulating layer from the insulating material and before the step of forming the trace from the conducting material. The seed layer is coupled between the insulating layer and the trace after the step of forming the trace from the conducting material. Also, the method can include providing a supporting material, and forming a supporting layer from the supporting material before the step of forming the insulating layer from the insulating material. After the step of forming the trace from the conducting material, the insulating layer has a first surface that is coupled to the trace, and a second surface that is coupled to the supporting layer.

In other, more detailed features of the invention, the method further includes providing an overlay material, and forming an overlay layer from the overlay material after the step of forming the trace from the conducting material. The overlay layer is coupled to the trace and the insulating layer. Also, the method can further include providing a resist material, and forming a resist layer from the resist material adjacent to the insulating layer. The resist layer is coupled to the insulating layer and is configured in a shape that defines a width of the trace. In addition, the conducting material can be copper or an alloy thereof, and the step of forming the trace from the conducting material can include depositing the conducting material onto the insulating layer.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings, where:

Unless otherwise indicated, the illustrations in the above figures are not necessarily drawn to scale.

DETAILED DESCRIPTION

Figure 6:
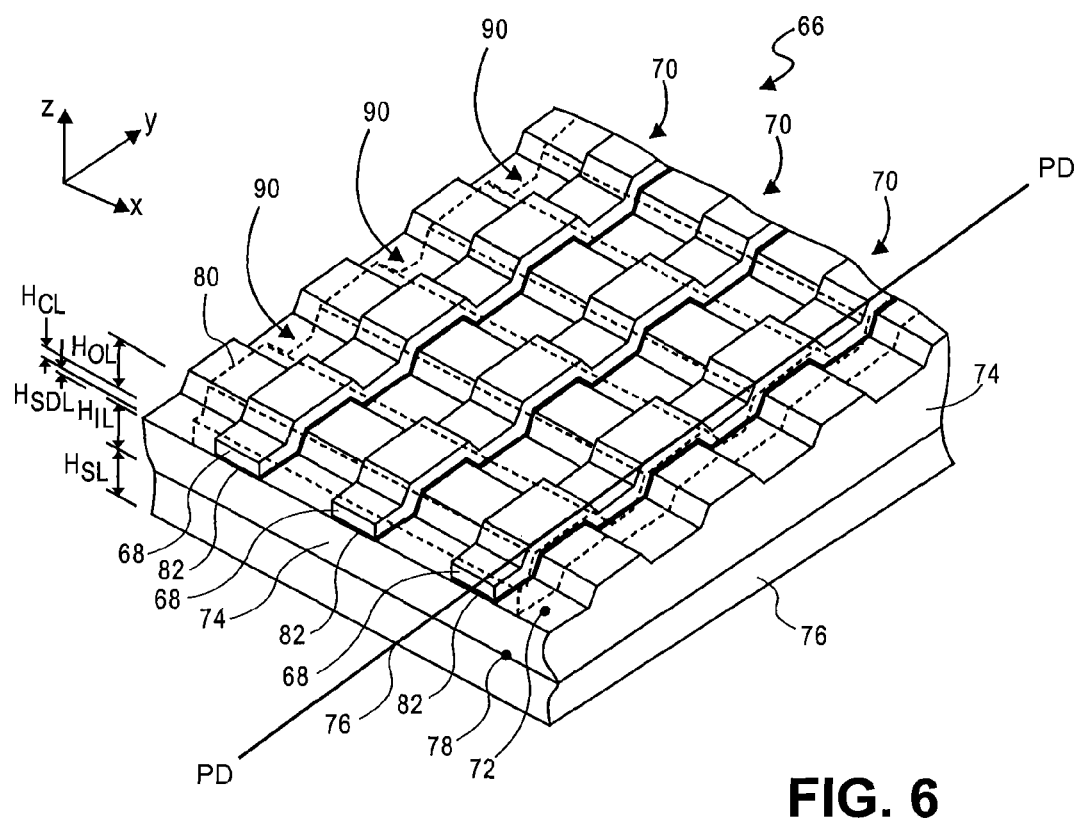
FIG. 6 is a partial perspective view of a strut according to a preferred embodiment.

Referring additionally to FIG. 6, which is a partial perspective view of a portion of an example strut 66, embodiments of the present invention include apparatuses, and, in particular, gimbals 22, that include plated or electrodeposited conducting layers 68 having unique zig-zag shaped traces 70 that provide reduced residual stress. The term "zig-zag", as used in this document, means having a series of turns, angles, or alterations in course. In embodiments of the apparatuses, reduction of the residual stress within the conducting material due to the zig-zag shape directly results in a reduction in the significance of creep of the conducting material, and thus, results in a reduction in the amount of PSA change that results from creep in the conducting material.

The traces 70 that are illustrated in FIG. 6 each are included in a conducting layer 68, which is made of a conducting material, e.g., plated or electrodeposited pure copper or an alloy thereof, and coupled to a top surface 72 of an insulating layer 74, which is made of an insulating material, e.g., polyimide SP-042, which is available from Toray Industries of Chiba, Japan. A supporting layer 76, which is made of stainless steel ("SST"), is coupled to a bottom surface 78 of the insulating layer. An optional overlay layer 80, which is made of an overlay material, e.g., polyimide or low-temperature, modified, acrylic insulation, is shown in FIG. 6 in dashed lines so the detail of the insulating layer and the conducting layer is visible. The overlay layer is coupled to the top surface of the insulating layer and the traces.

A primary direction of travel line PD-PD can be defined as shown in FIG. 6 along a line that the signal trace generally travels, discounting the individual zigs and zags. The zig-zag shape can then be defined by the trace having, in the following sequence: a first section 70a that lies at least partially on the trace's primary direction of travel line PD-PD, a second section 70b that deviates away from that line, a third section 70c that converges back toward that line, and a fourth section 70d that, once again, lies on that line. There can also be a fifth section 70e between sections 70b and 70c and which travels parallel to the primary direction of travel line, or otherwise separate from that line. As seen in FIG. 6, all of those sections are located in an area in which trace 70 does not cross over or under any other traces carrying electrical signals, such crossovers being known in the prior art for creating "twisted pair" transmission lines in suspension circuits for the purpose of reducing electrical crosstalk. As used herein, the phrase that a section of the trace lies "on the trace's primary direction of travel line" means that the trace touches that line. That phrase does not require that the trace travels in a straight line and actually on that line for any finite distance.

Figure 1:
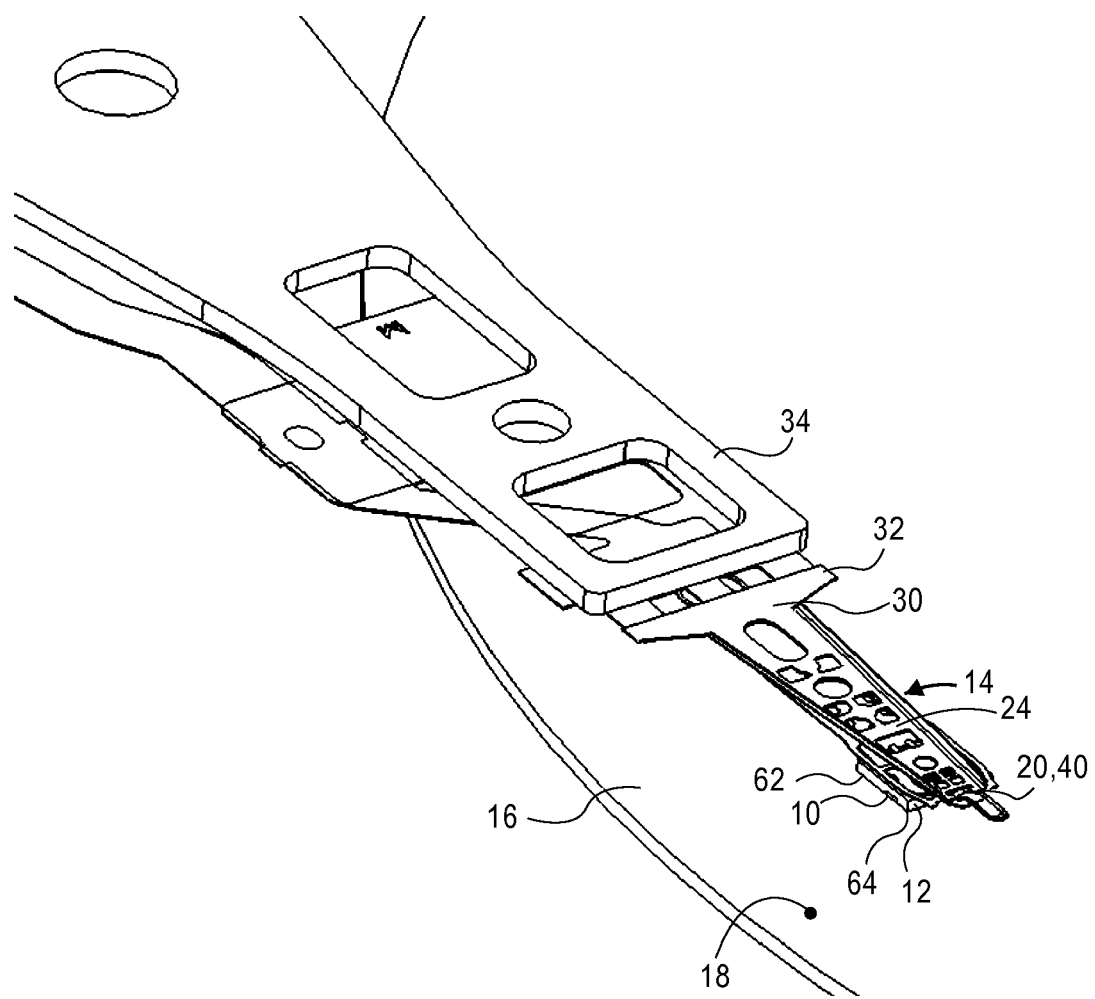
FIG. 1 is a perspective view of an example disk drive suspension, slider, actuator arm, and disk.
Figure 2:
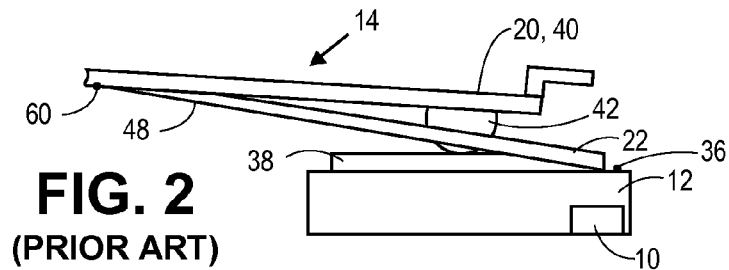
FIG. 2 is a partial side elevational view of a distal end of the example disk drive suspension and slider shown in FIG. 1.
Figure 3:
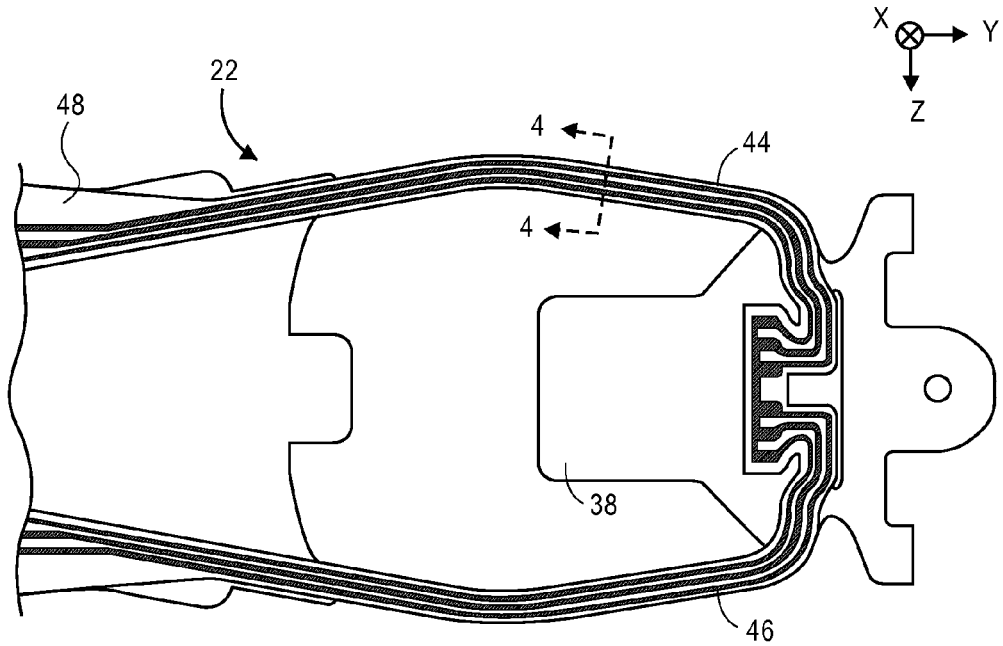
FIG. 3 is a partial bottom plan view of an example gimbal, which includes a pair of struts, and is included as part of the disk drive suspension shown in FIG. 1.
Figure 4:
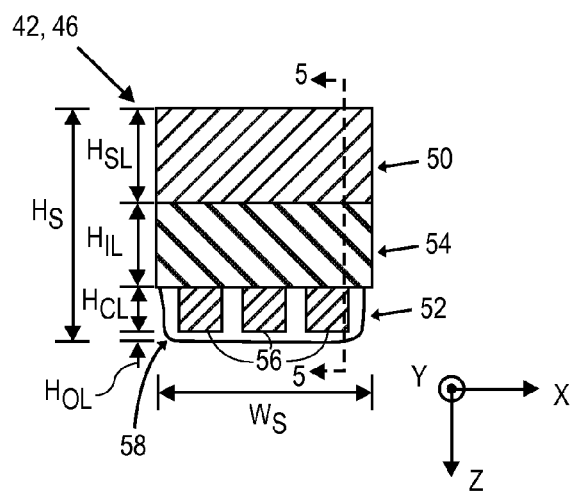
FIG. 4 is a sectional view of one of the struts shown in FIG. 3 along line 4-4.
Figure 5:
FIG. 5 is a partial sectional view of the struts shown in FIG. 4 along line 5-5.
Figure 7:
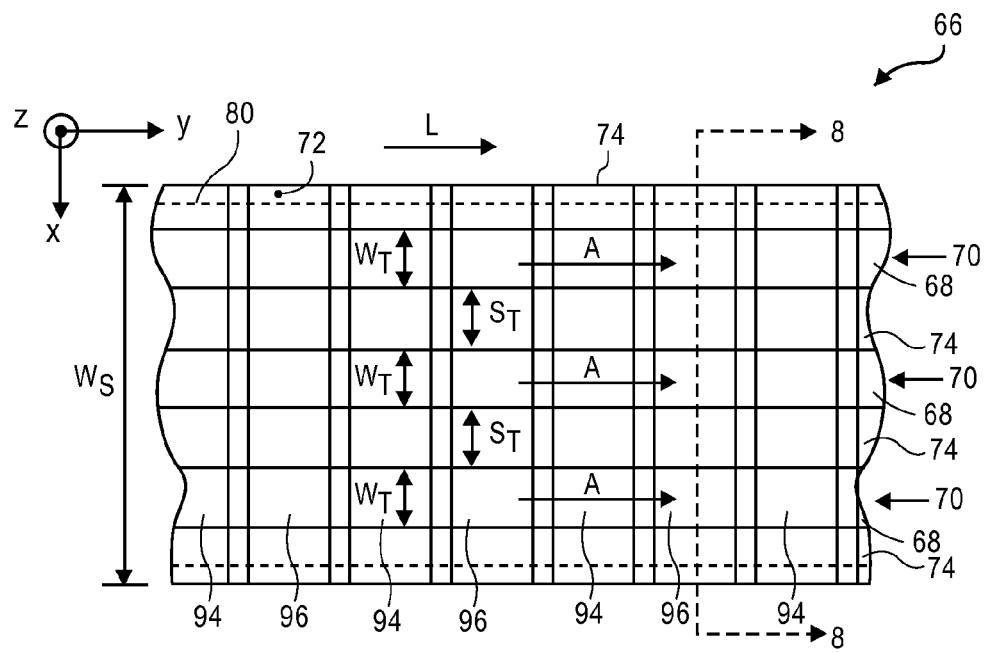
FIG. 7 is a partial top plan view of the strut shown in FIG. 6 according to a preferred embodiment.

Referring additionally to FIG. 7, which is a top plan view of the portion of the example strut 66 shown in FIG. 5 in the x-y plane, the width of each strut ("$W_S$") can range in value from approximately 100 μm to approximately 500 μm. The width of each trace ("$W_T$") can range from approximately 10 μm to approximately 100 μm. The spacing between each of the traces ("$S_T$") can range from approximately the width of each trace ("$W_T$") to approximately twice the width of each trace ("$W_T$"). In an example embodiment of the strut, the width of each trace ("$W_T$") is approximately 20 μm and the spacing between each of the traces ("$S_T$") also is approximately 20 μm. In another example embodiment of the strut, the width of each trace ("$W_T$") is approximately 50 μm and the spacing between each of the traces ("$S_T$") also is approximately 50 μm. As shown in the top plan view of FIG. 7, the traces 70 run approximately parallel to one another along the length of the strut, which is depicted as arrow "L". Each trace has an axis, which is depicted in FIG. 7 as arrow "A". While the width of each trace ("$W_T$"), and the spacing between traces ("$S_T$") are depicted in FIG. 7 (and also FIG. 8, which is discussed below) as constant values, the width of each trace ("$W_T$") can vary from trace to trace, and the spacing between the traces ("$S_T$") can vary.

Figure 8:
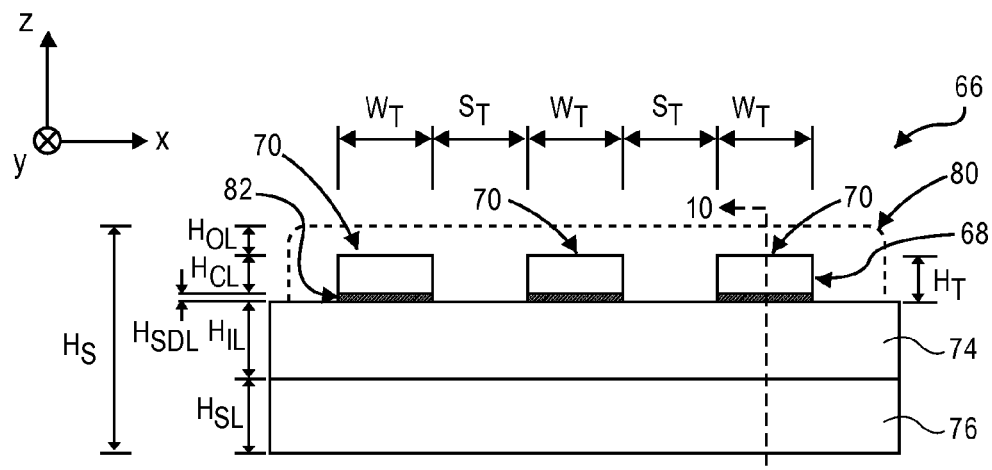
FIG. 8 is a sectional view of the strut shown in FIG. 7 along line 8-8 according to a preferred embodiment.

Referring additionally to FIG. 8, which is a sectional view of the strut 66 shown in FIG. 7 along line 8-8 in the x-z plane, the example strut's supporting layer 76, insulating layer 74, conducting layer 68, and optional overlay layer 80 are shown. The supporting layer can range in height ("$H_{SL}$") from approximately 15 μm to approximately 25 μm, the insulating layer can range in height ("$H_{IL}$"), also referred to as the thickness of the insulating layer, from approximately 5 μm to approximately 20 μm. An adhesive seed layer 82 that is made from a seed material, e.g., chromium or an alloy of nickel (an example is Monel, which is manufactured by Special Metals Corporation of Hartford, N.Y.) and copper, is sputtered and coupled between the insulating layer and the conducting layer. The adhesive seed layer has a height ("$H_{SDL}$") that can range in value from approximately 250 nm to approximately 700 nm, and consists of approximately 50 nm to approximately 200 nm of chromium or nickel alloy followed by approximately 200 nm to approximately 500 nm of copper. The conducting layer can range in height ("$H_{CL}$") from approximately 5 μm to approximately 20 μm. While the height of each of the traces ("$H_T$") is shown to be constant for all of the traces 70 in FIG. 8, in other embodiments, the heights of each of the traces need not be equal. The height of the overlay layer ("$H_{OL}$") can range in value from approximately 4 μm to approximately 10 μm. In specific embodiments, the strut need not include the overlay layer, and thus, in these embodiments of the strut, the gimbal 22 may have a softer stiffness value. The overall height of each strut ("$H_S$"), which is defined by the combination of the height of the supporting layer ("$H_{SL}$"), the height of the insulating layer ("$H_{IL}$"), the height of a seed layer ("$H_{SDL}$"), the height of the conducting layer ("$H_{CL}$"), and the height of the overlay layer ("$H_{OL}$"), can range from approximately 20 µm to approximately 60 µm.

Figure 9:
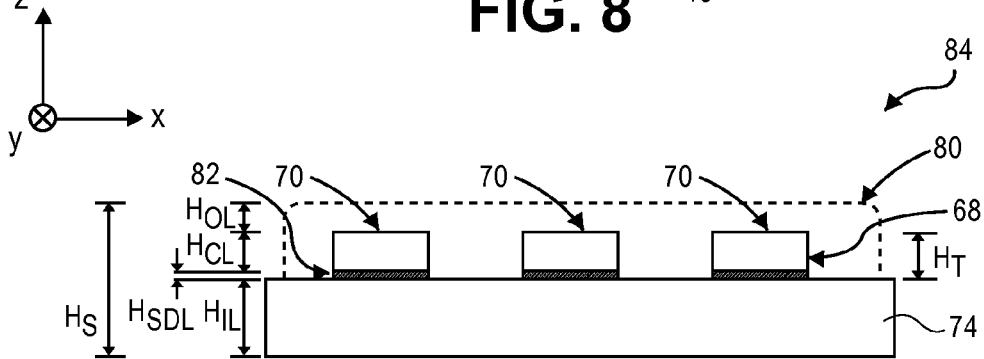
FIG. 9 is a sectional view of another strut according to a preferred embodiment.

An additional embodiment of a strut 84 is shown in FIG. 9, which is a partial sectional view in the x-z plane of another strut that does not include a supporting layer 76 along a portion of its entire length, or does not include a supporting layer at all. In this embodiment, the overall height of each strut ("$H_S$") equals the combination of the height of the insulating layer ("$H_{IL}$"), the height of the seed layer ("$H_{SDL}$"), the height of the conducting layer ("$H_{CL}$"), and the height of the overlay layer ("$H_{OL}$").

While three traces 70 are included in the conducting layer 68 shown in FIGS. 6-9, other embodiments can include more than three traces or less than three traces, even only one trace. When a strut 66 and 84 includes two or more traces, the traces collectively are referred to as a "plurality of traces". Accordingly, in this document, the word "plurality" means two or more.

Figure 10:
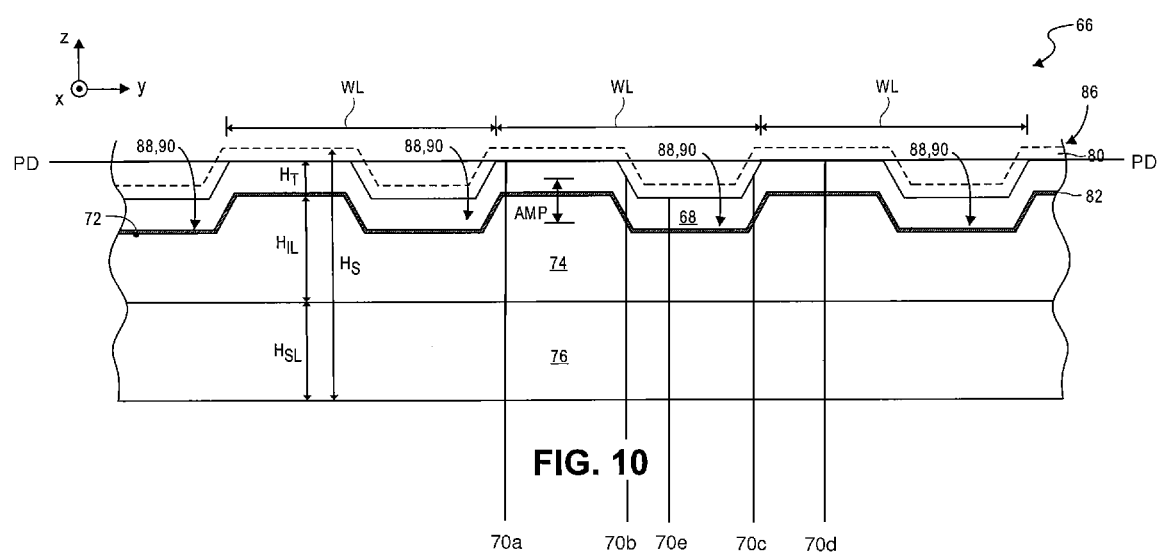
FIG. 10 is a partial sectional view of the strut shown in FIG. 8 along line 10-10 according to a preferred embodiment.

Referring additional to FIG. 10, which is a partial sectional view of the strut 66 shown in FIG. 8 along line 10-10 in the y-z plane, the geometric details of the supporting layer 76, the insulating layer 74, the seed layer 82, the conducting layer 68, and the overlay layer 80 can be seen. In particular, FIG. 10 in combination with FIG. 6 shows that the trace 70, the overlay layer, the seed layer, and the top surface 72 of the insulating layer have a zig-zag configuration 86 (also referred to as a "zig-zag shape"). While the height of the trace ("$H_T$") in FIG. 10 remains a relatively constant value, there is a zig-zag fluctuation in overall height of the strut ("$H_S$"). The change in height of the strut ("$H_S$") varies because of the zig-zag configuration of the trace in combination with respective dips or depressions 88 in the top surface of the insulating layer. The depressions in the top surface of the insulating layer shown in FIGS. 6 and 10 are troughs or trenches 90 that extend across the strut along the x-axis.

Figure 11:
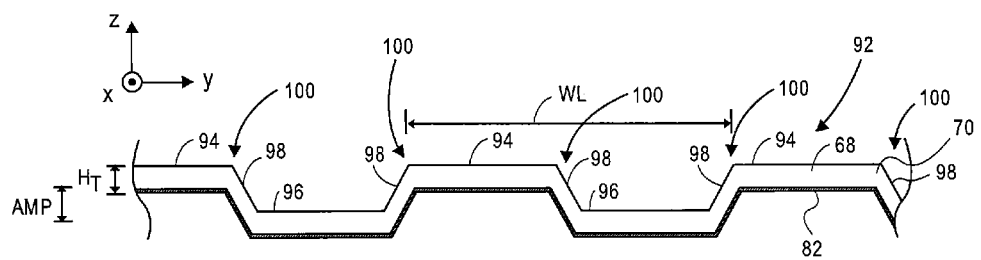
FIG. 11 is a partial sectional view of a conducting layer shown in FIG. 10 according to a preferred embodiment.

FIG. 11 illustrates a partial sectional view of just a portion 92 of a trace 70 from FIG. 10 in the y-z plane. As shown in FIG. 11, each zig-zag shaped trace includes a plurality of relatively flat portions 94 and 96 that are separate from one another and interconnected with sloped portions 98. Accordingly, the trace includes a plurality of zig-zag corrugations 100 that are formed by the repetitive oscillatory shape 86 of the trace. The plurality of zig-zag corrugations provides the strut 66 with a stiffness that is greater than if the strut did not include a trace with the plurality of zig-zag corrugations. In particular, the zig-zag corrugations shown in the example embodiments shown in FIGS. 6-11 have an orientation along the x-axis, and the stiffness of the strut is greater in a direction that runs parallel to the orientation of the plurality of zig-zag corrugations (in this example, along the x-axis). The trace's repetitive oscillatory shape can be characterized as having a wavelength ("WL") that can range in value from approximately one half to approximately four times the width of the trace ("$W_T$"). Also, the trace's repetitive oscillatory shape can be characterized as having an amplitude ("AMP"), as measured midway through the height of the trace ("$H_T$"), that can range in value from approximately one third to approximately three fourths of the insulating layer's maximum value of thickness/height ("$H_{IL}$").

Figure 12:
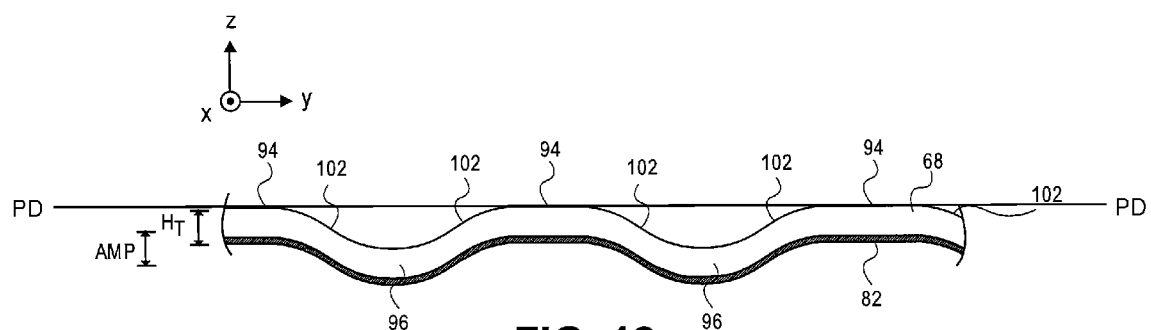
FIG. 12 is a partial sectional view of another conducting layer according to a preferred embodiment.
Figure 13:
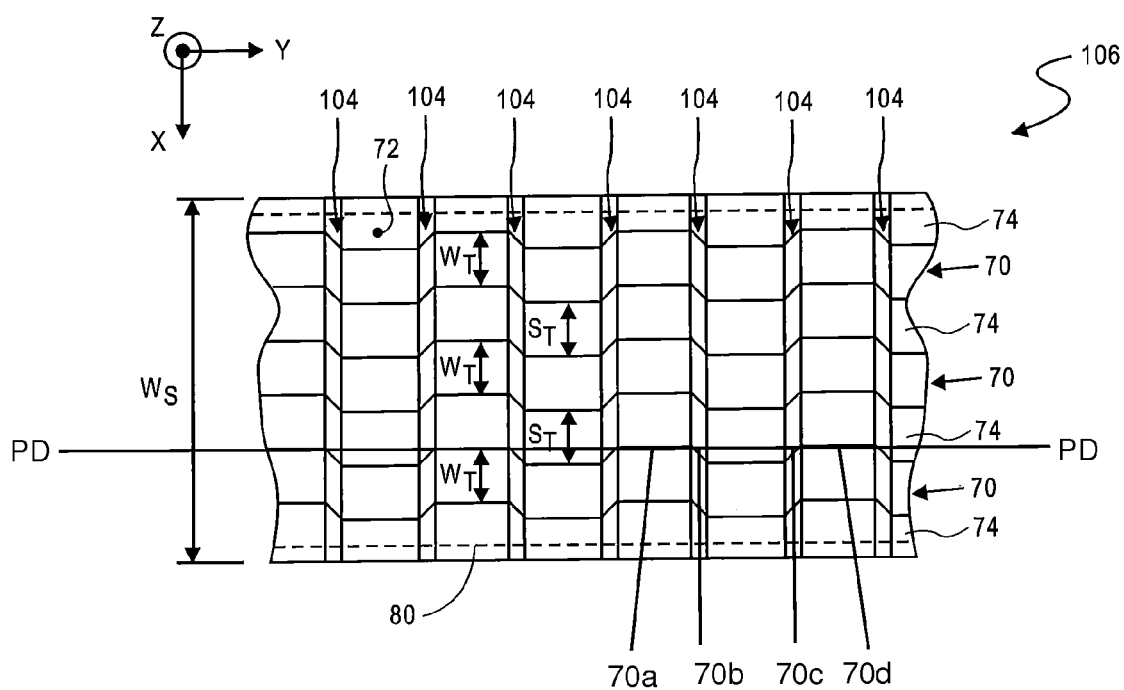
FIG. 13 is a partial top plan view of another strut according to a preferred embodiment.

While the cross-sectional shape of the sloped portions 98 shown in FIG. 11 is straight, in other embodiments, the cross-sectional shape of the sloped portions 102 can be curved as shown in FIG. 12. While embodiments of the traces 70 shown in FIGS. 6-9 are shown as straight along the y-axis, the traces can include slight wiggles and/or jogs 104 in the x-y axis as shown in FIG. 13, which is a partial top plan view of another embodiment of a strut 106 that is analogous to FIG. 7. Thus, the shape of the trace when looking along the y-axis need not be straight. Accordingly, the trace includes sections having a shape that is straight, angled, and/or curved. Embodiments can include apparatuses, e.g., a disk drive suspension gimbal 22, where all of the plurality of traces have the zig-zag shape 86, as shown in FIGS. 6, 10, and 11-13. In other embodiments, the apparatus can include traces where at least one and less than all of the plurality of traces have the zig-zag shape.

As oriented in the figures, gimbal 22 generally lies on and defines a horizontal plane, i.e., an x-y plane, and the zig-zags of the traces 70 shown in FIGS. 6, 10-12, 14, and 15 define changes in the vertical positions of the traces at successive points along those traces. In other words, the zig-zag shape includes back-and-forth changes in the vertical positions of traces 70, relative to a horizontal x-y plane defined by gimbal 22. In the embodiments shown, the back-and-forth changes define a generally repeating pattern of back-and-forth changes in the vertical positions of traces 70.

In the embodiment of FIG. 13, the traces also have horizontal zig-zags as shown. In other words, the zig-zag shape of trace 70 further includes back-and-forth change in the horizontal positions of traces 70, i.e., changes in the x-y position of a trace in a horizontal direction that is orthogonal to the overall direction of travel of the trace. In the embodiment shown, the back-and-forth changes define a generally repeating pattern of small back-and-forth changes in the horizontal positions of traces 70 in a horizontal direction that is orthogonal to the overall direction of travel of the trace In the embodiment of FIG. 13, a primary direction of travel line PD-PD can be defined as shown along a line that the signal trace generally travels, discounting the individual zigs and zags. The zig-zag shape includes: a first section 70a that lies at least partially on the trace's primary direction of travel line PD-PD, a second section 70b that deviates away from that line, a third section 70c that converges back toward that line, and a fourth section 70d that, once again, lies on that line. As seen in FIG. 13, all of those sections are located in an area in which trace 70 does not cross over or under any other traces carrying electrical signals, such crossovers being known in the prior art for creating "twisted pair" transmission lines in suspension circuits for the purpose of reducing electrical crosstalk.

Figure 14A:
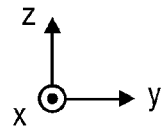
FIG. 14A is a partial sectional view along a first plane of a supporting layer that is formed according to a preferred method.
Figure 14A:
Figure 14B:
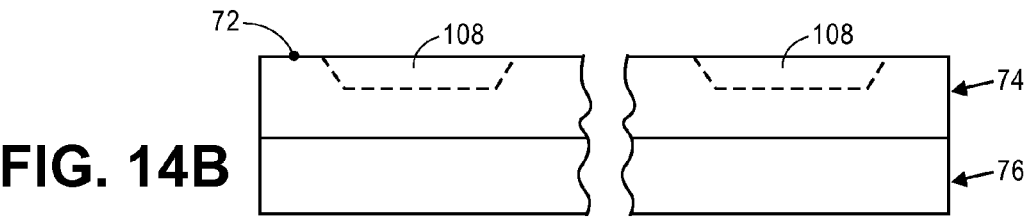
FIG. 14B is a partial sectional view of an insulating layer and the supporting layer of FIG. 14A where the insulating layer is formed according to a preferred embodiment.

Embodiments of the present invention can be formed using a variety of selectively additive processes that are known to individuals having ordinary skill in the art, for example, casting, vapor deposition, plating, and sputtering, which build-up the supporting layer 76 first followed by the insulating layer 74, the seed layer 82, the conducting layer 68, and the overlay layer 80 (if present). FIGS. 14A-K are partial sectional views of the layers that are included in the strut 66 shown in FIGS. 6-8 and 10 in the y-z plane. In particular, FIGS. 14A-K illustrate the sequential formation of the individual layers of strut embodiments. More specifically, FIG. 14A shows the supporting layer after it has been formed from the supporting material, e.g., cold-rolled 300 series stainless steel. Next, FIG. 14B shows the insulating layer after it has been formed from the insulating material, e.g., polyimide, on top of the supporting layer and cured.

Figure 14C:
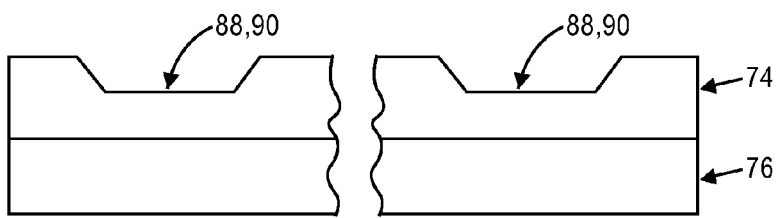
FIG. 14C is a partial sectional view of the insulating and supporting layers of FIG. 14B after portions of the insulating layer have been removed according to a preferred method.
Figure 14D:
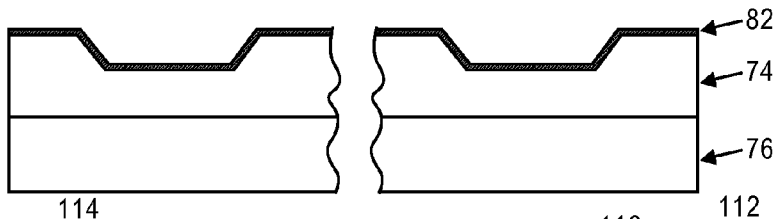
FIG. 14D is a partial sectional view of the insulating and supporting layer of FIG. 14C after a seed layer has been formed on top of the insulating layer according to a preferred method.

FIG. 14C shows the insulating layer 74 and the supporting layer 76 after selected portions 108 (the small trenched areas 90 that are defined by a dashed line in FIG. 14B) in the top surface 72 of the insulating layer have been removed using a subtractive process, e.g., using a laser, photolithographic, and/or chemical milling processes, thus, forming a plurality of depressions 88 in the insulating layer's top surface. In one embodiment, the selected portions are removed from photolithographically sensitive polyimide in the insulating layer. Alternatively, the selected portions of the insulating layer can be laser-ablated using, for example, a galvo-rastering method using a galvo or cylindrical compression telescope that provides, in an accurate and expedient manner, a nicely curved geometry. Subsequently, a thin adhesive seed layer 82, which is considered to be part of the trace 70, and having a height ("$H_{SDL}$") that is preferably less than approximately 700 nm, can be deposited, e.g., sputter-deposited, on top of the insulating layer, as shown in FIG. 14D.

Figure 14E:
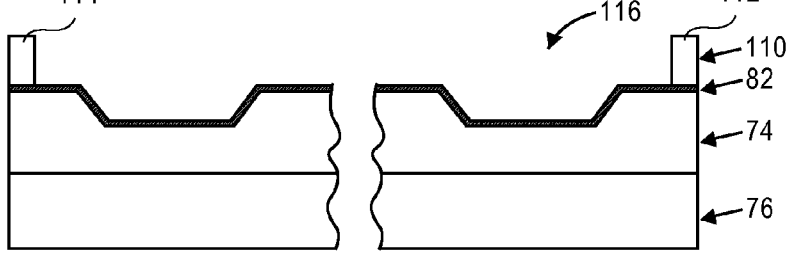
FIG. 14E is a partial sectional view of a resist layer and the seed, insulating, and supporting layers of FIG. 14D where the resist layer has been formed on top of the seed layer according to a preferred method.

FIG. 14E shows a resist layer 110 that has been formed from a resist material, e.g., dry film resist material that is manufactured by Dupont of Wilmington, Del., on top of the thin seed layer 82. The resist material in FIG. 14E has been exposed and developed using, for example, a photo-resist process, which defines resist portions 112 and 114, such that the resist layer includes a gap 116, which is configured to define the length and width of each trace ("$W_T$") in the to be deposited conducting layer 68, and the spacing between the tracks ("$S_T$").

Figure 14F:
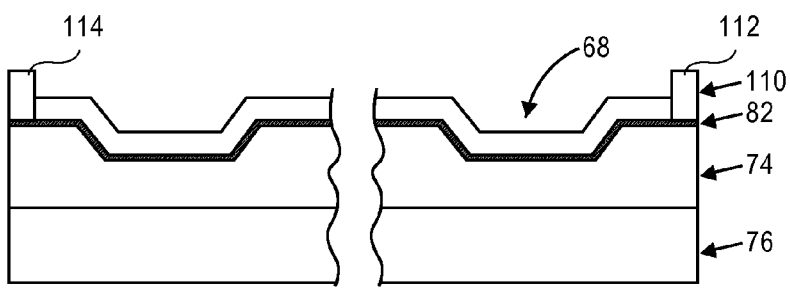
FIG. 14F is a partial sectional view of a conducting layer and the resist, seed, insulating, and supporting layers of FIG. 14E where the conducting layer has been formed on top of the seed layer according to a preferred method.
Figure 14G:
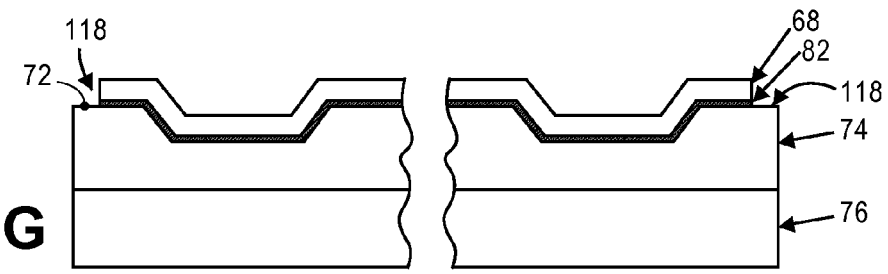
FIG. 14G is a partial sectional view of the conducting, seed, insulating, and supporting layers of FIG. 14F after the removal of the resist layer according to a preferred method.
Figure 14H:
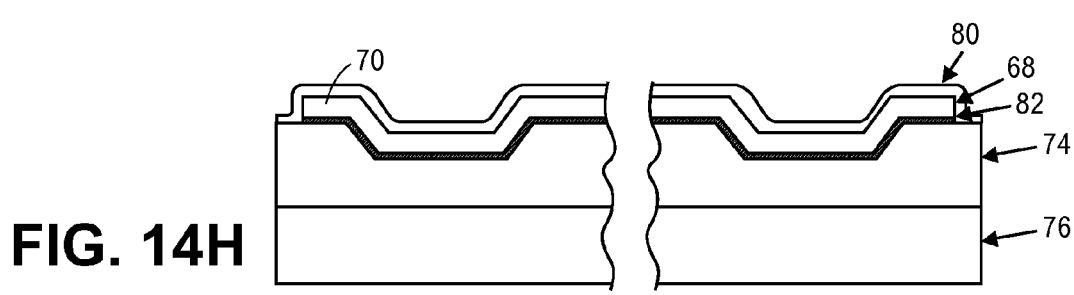
FIG. 14H is a partial sectional view of an overlay layer and the conducting, seed, insulating, and supporting layers of FIG. 14G where the overlay layer has been formed on top of the conducting and insulating layers.

FIG. 14F shows the conducting layer 68 after it has been formed from the conducting material, e.g., plated or electrodeposited (e.g., sputtered) pure copper or alloy thereof, on top of the seed layer 82 and within the gap 116 in the resist layer 110. Next, the resist layer and portions of the seed layer that are coupled between the resist layer and the insulating layer 74, are removed, e.g., stripped, from the top surface 72 of the insulating layer, as shown in FIG. 14G. Next, an overlay layer 80, if present, can be deposited on top of the conducting layer's trace(s) 70 and the exposed portions 118 of the insulating layer, as shown in FIG. 14H, and cured, for example, using a photo-imaging process.

Figure 14I:
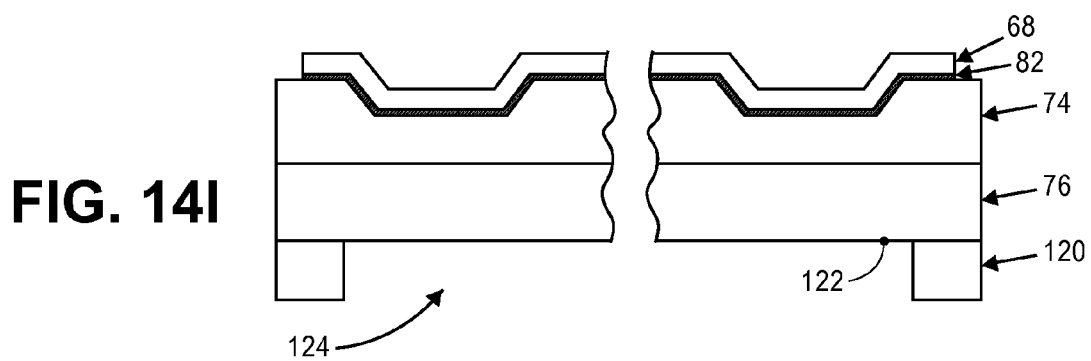
FIG. 14I is a partial sectional view of a resist layer and the conducting, seed, insulating, and supporting layers of FIG. 14G where the resist layer has been formed to couple to the supporting layer according to a preferred method.
Figure 14J:
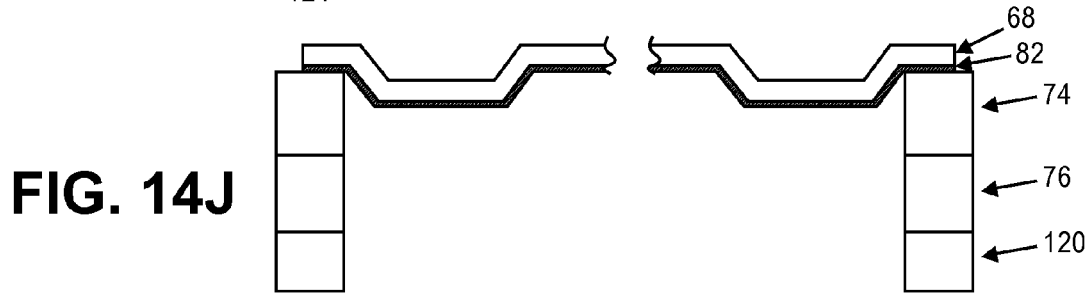
FIG. 14J is a partial sectional view of the resist, conducting, seed, insulating, and supporting layers of FIG. 14I where exposed portions of the supporting and insulating layers have been removed according to a preferred method.
Figure 14K:
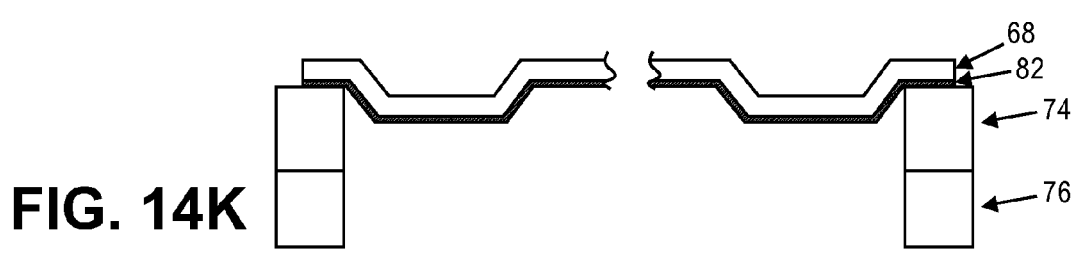
FIG. 14K is a partial sectional view of the conducting, seed, insulating, and supporting layers of FIG. 14J after the removal of the resist layer from the bottom surface of the supporting layer according to a preferred method.

Optionally, another resist layer 120 is added to the bottom surface 122 of the supporting layer 76 as shown in FIG. 14I. The resist material has been exposed and developed such that the resist layer includes a gap 124. FIG. 14J shows the strut 66 after the exposed regions of the supporting layer and the insulating layer 74, i.e., the regions of the supporting layer and the insulating layer that are not covered by the resist layer, have been removed using, for example, an etching process. Finally, as shown in FIG. 14K, the resist layer is removed from the bottom surface of the supporting layer. All of the above manufacturing/processing steps can be implemented using processing techniques that are known to individuals having ordinary skill in the art.

Figure 15G:
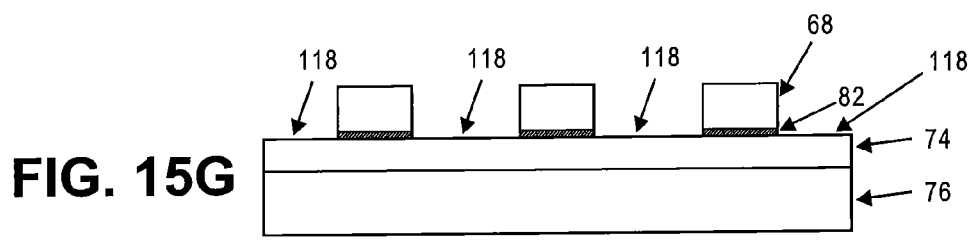
FIG. 15G is a sectional view of the conducting, seed, insulating, and supporting layers of FIG. 15F after the removal of the resist layer according to a preferred method.
Figure 15H:
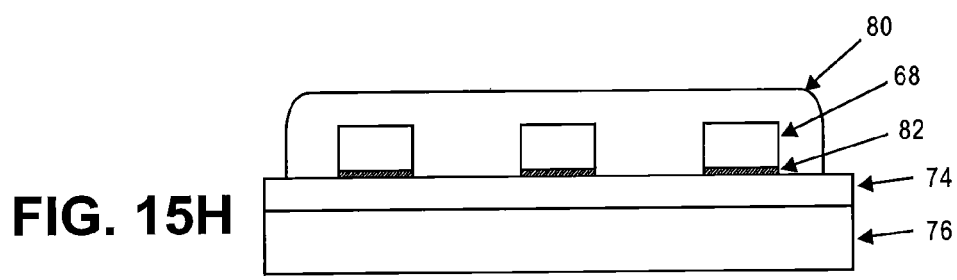
FIG. 15H is a sectional view of an overlay layer and the conducting, seed, insulating, and supporting layers of FIG. 15G where the overlay layer has been formed on top of the conducting and insulating layers.
Figure 15A:
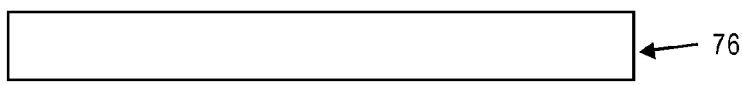
FIG. 15A is a sectional view along a second plane of a supporting layer that is formed according to a preferred method.
Figure 15B:
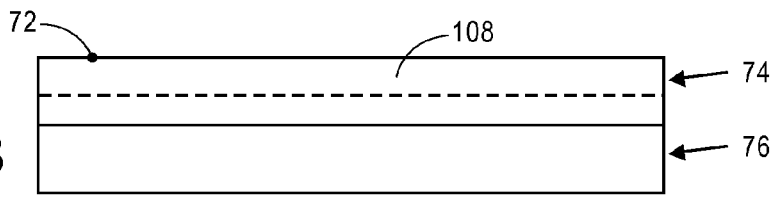
FIG. 15B is a sectional view of an insulating layer and the supporting layer of FIG. 15A where the insulating layer is formed according to a preferred embodiment.
Figure 15C:
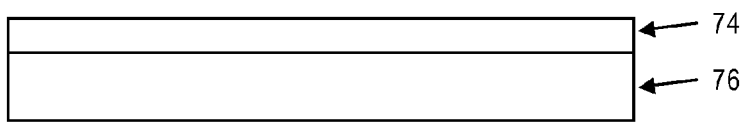
FIG. 15C is a sectional view of the insulating and supporting layers of FIG. 15B after portions of the insulating layer have been removed according to a preferred method.
Figure 15D:
FIG. 15D is a sectional view of the insulating and supporting layers of FIG. 15C after a seed layer has been formed on top of the insulating layer according to a preferred method.
Figure 15E:
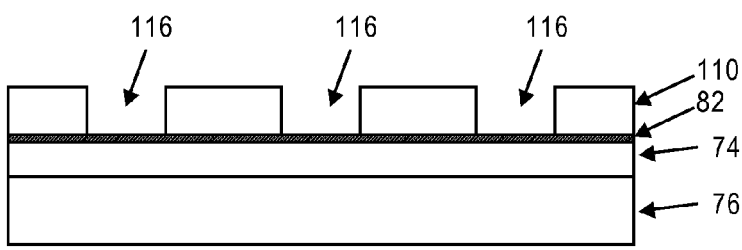
FIG. 15E is a sectional view of a resist layer and the seed, insulating, and supporting layers of FIG. 15D where the resist layer has been formed on top of the seed layer according to a preferred method.

FIGS. 15A-H are partial sectional views in the x-z plane of the layers 68, 74, 76, 80, and 82 of an embodiment of a gimbal strut 66. More specifically, FIG. 15A shows the formed supporting layer 76, FIG. 15B shows the insulating layer 74 formed on top of supporting layer, FIG. 15C shows the insulating layer and the supporting layer after selected portions 108 (the trench 90 defined by a dashed line in FIG. 15B) in the top surface 72 of the insulating layer has been removed, and FIG. 15D shows the thin seed layer 82 formed on top of the insulating layer. FIG. 15E shows the formed resist layer 110 on top of the thin seed layer and the gaps 116, which define the length ("$L_T$") and width ("$W_T$") of each of the tracks and the spacing between the tracks ("$S_T$").

Figure 15F:
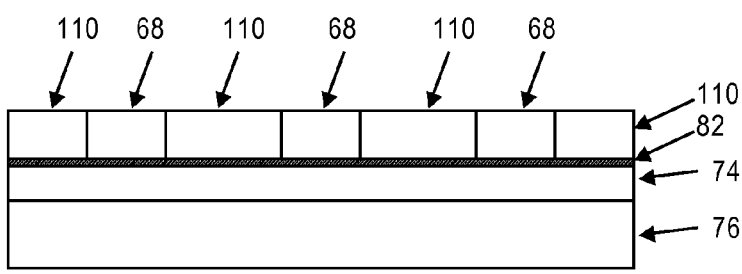
FIG. 15F is a sectional view of a conducting layer and the resist, seed, insulating, and supporting layers of FIG. 15E where the conducting layer has been formed on top of the seed layer according to a preferred method.

FIG. 15F shows the conducting layer 68 formed on top of the seed layer 82 and within the gaps 116 in the resist layer. Next, the resist layer 110 and portions of the seed layer that are coupled between the resist layer and the insulating layer 74, are removed, as shown in FIG. 15G. An overlay layer 80 can be deposited on top of the conducting layer's traces 70 and the exposed portions 118 of the insulating layer, as shown in FIG. 15H.

Figure 16:
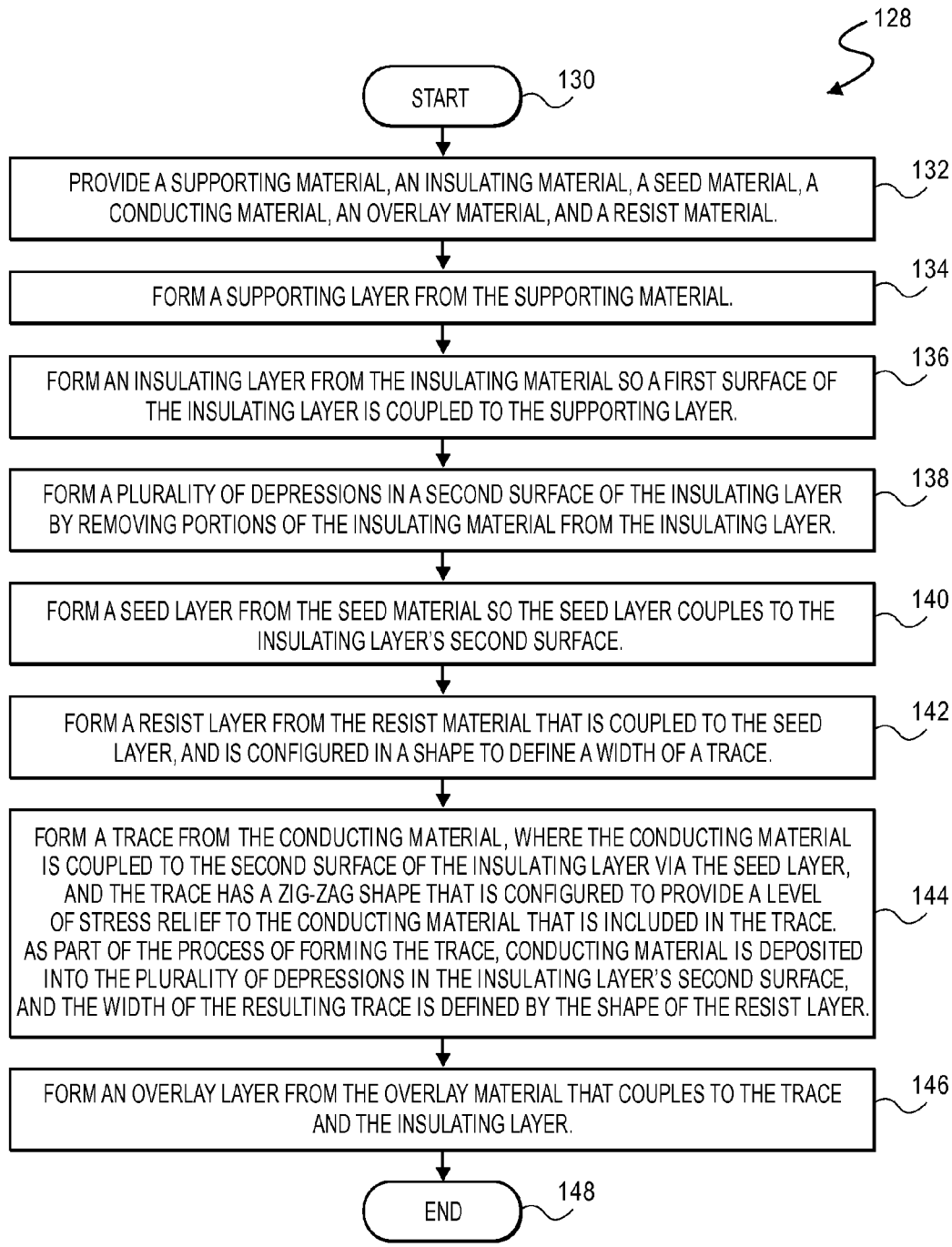
FIG. 16 is a flowchart for an example method of manufacturing an apparatus according to the invention.

An exemplary method for manufacturing a disk drive gimbal 22 according to the present invention is illustrated in the algorithm 128 of FIG. 16. After starting the method at step 130, the next step 132 is to provide a supporting material, an insulating material, a seed material, a conducting material, an overlay material, and a resist material. The next step 134 is to form a supporting layer 76 from the supporting material. Next, at step 136, an insulating layer 74 is formed from the insulating material so a first surface 78 of the insulating layer is coupled to the supporting layer. At step 138, a plurality of depressions 88 (e.g., trenches 90) are formed in a second surface 72 of the insulating layer by removing portions 108 of the insulating material from the insulating layer.

The algorithm 128 also includes the step 140 of forming a seed layer 82 from the seed material so the seed layer couples to the insulating layer's second surface 72. Next, at step 142 a resist layer 110 is formed from the resist material. The resist layer is coupled to the seed layer and configured to define the width of a trace ("$W_T$"). At step 144, a trace 70 is formed from the conducting material, where the conducting material is coupled to the second surface of the insulating layer 74 via the seed layer. The trace has a zig-zag shape 86 that is configured to provide a level of stress relief to the conducting material that is included in the trace. As part of the process of forming the trace, the conducting material is deposited into the plurality of depressions 88 in the insulating layer's second surface, and the width of the resulting trace ("$W_T$") is defined by the shape of the resist layer. Next, at step 146, an overlay layer 80 is formed from the overlay material, so the overlay layer is coupled to the trace and the insulating layer. The method ends at step 148.

Figure 17:
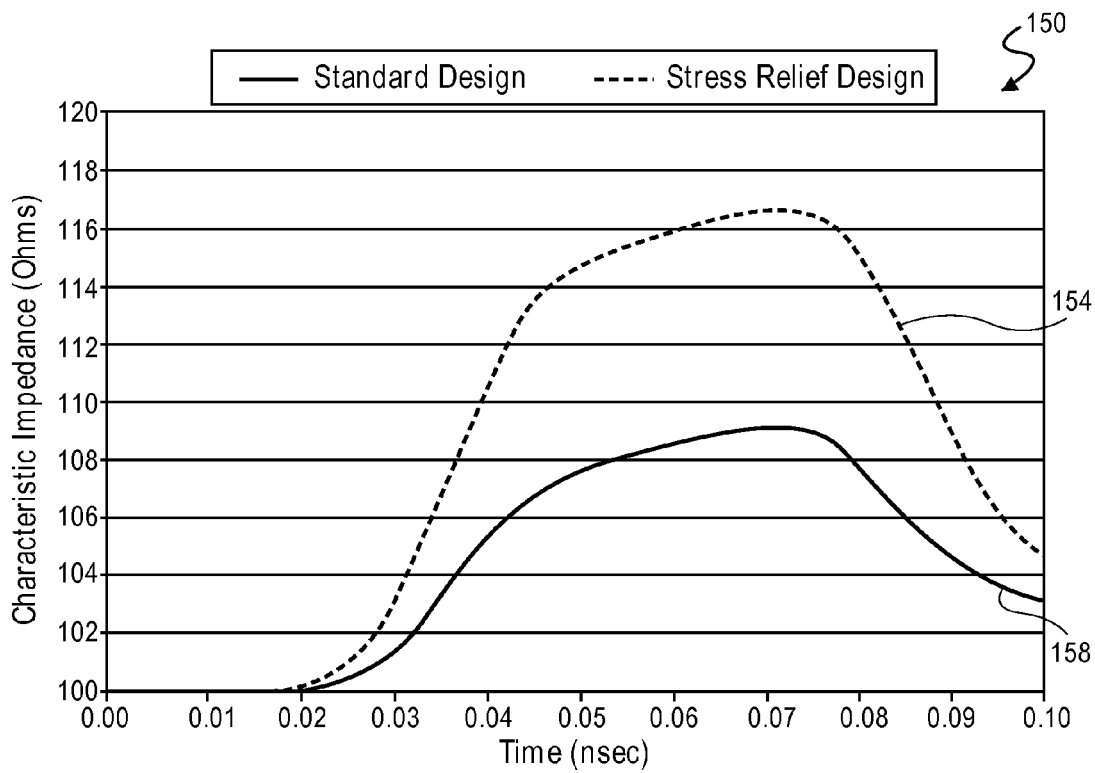
FIG. 17 is a graph of characteristic impedance as a function of time for strut traces according to preferred embodiments and other embodiments of struts without traces according to preferred embodiments.
Figure 18:
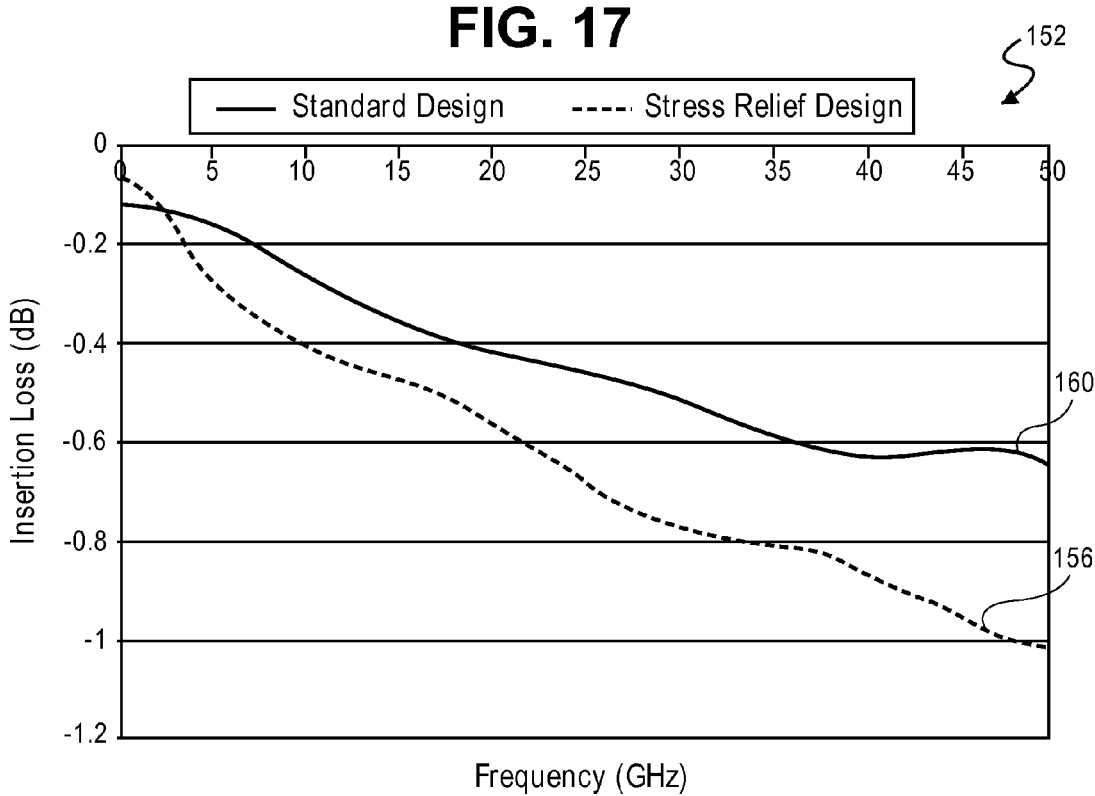
FIG. 18 is a graph of insertion loss as a function of frequency for strut traces according to preferred embodiments and other embodiments of struts without traces according to preferred embodiments.

Advantageously, the zig-zag shape 86 of the gimbal's traces 70 results gimbal strut embodiments 66 that offer improved mechanical performance, without greatly affecting the gimbal's electrical performance. In particular, the gimbal's zig-zag shaped traces provide stress relief, and thus, result in a reduction in the PSA change over time. The electrical performance that results from the embodiments of the present invention is shown in the graphs of FIGS. 17 and 18. In particular, FIGS. 17 and 18 illustrate a graph 150 of characteristic impedance as a function of time of transmission for an electrical signal and a graph 152 of insertion loss as a function of a transmitted electrical signal's frequency both for a strut 66 having a pair of traces 70 that are formed in zig-zag pattern 86 (see lines 154 and 156, respectively) and for a strut 44 and 46 having a pair of traces 56 that are formed without the zig-zag pattern 86 (see lines 158 and 160, respectively). In both instances, the traces are 20 µm wide ("$W_T$"), 10 µm in height ("$H_T$"), and spaced apart from one another by 20 µm ("$S_T$").

As shown in FIG. 17, the characteristic impedance is higher for the strut 66 that has the zig-zag shaped traces 70 by a maximum of approximately 7.5Ω in the 0.05 nanosecond to 0.08 nanosecond timeframe with less of a difference in characteristic impedance below the 0.05 nanosecond timeframe and above the 0.08 nanosecond timeframe. Based on FIG. 18, it can be seen that the use of struts with zig-zag-shaped traces results in a slightly higher value of insertion loss as a function of frequency beyond approximately 2 GHz. This is likely due to the increased impedance in the traces that results from the zig-zag shape (see FIG. 17). While the traces that have a zig-zag shape have a slightly higher impedance and insertion loss, the overall mechanical benefits of having traces with less internal stress is highly advantageous. Accordingly, using zig-zag-shaped traces does slightly impact the electrical performance of an apparatus, e.g., a disk drive gimbal strut, however, by adjusting the width of the traces ("$W_T$") and the space between the traces ("$S_T$"), the electrical performance of apparatuses that include zig-zag-shaped traces should match the performance of corresponding apparatuses 44 and 46 that include traces 56 that do not have the zig-zag shape 86.

Advantageously, embodiments of struts 66 and 84 according to the present invention promote stress relief within the conducting material in the traces 70. Stress relief is promoted within the traces as a result of the geometry of the trace's zig-zag configuration 86. The stress relief is oriented longitudinal (i.e., parallel) to the axis (see arrow "A") of each trace, and thus, allows for the adjustments that are made to the supporting layer 76, as a result of the PSA adjustment, to dominate the structure of the strut. The level of stress relief provided to the conducting material as a result of the zig-zag shape helps to reduce the effects of creep in an apparatus, e.g., a disk drive gimbal 22, that includes the conducting material. Accordingly, the embodiments reduce the effect of creep in the material that makes up the conducting layer 68 on the overall mechanical characteristics, e.g., the stability of the pitch angle of a gimbal, while allowing for the use of plated or electrodeposited copper or an alloy thereof in the conducting layer. This facilitates the use of conducting layers that include plated or electrodeposited materials instead of cold-rolled materials, and the improvement of apparatus manufacturing yields.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

I claim:

1. A disk drive gimbal comprising:
   a. a strut that includes a trace;
   b. wherein the trace has a zig-zag shape and a primary direction of travel line; and
   c. wherein the zig-zag shape includes in the following sequence:
      a first section that lies at least partially on said primary direction of travel line;
      a second section that deviates away from said line;
      a third section that converges back toward said line; and
      a fourth section that lies on said line;
      the first, second, third, and fourth sections all lying within an area in which the trace does not cross over or under any other traces carrying electrical signals.

2. The disk drive gimbal according to claim 1, wherein:
   a. the trace includes a plurality of zig-zag corrugations;
   b. the strut has a stiffness; and
   c. the stiffness of the strut with the trace having the plurality of zig-zag corrugations is greater than if the trace did not include the plurality of zig-zag corrugations.

3. The disk drive gimbal according to claim 2, wherein:
   a. the plurality of zig-zag corrugations have an orientation along an axis; and
   b. the stiffness of the strut with the trace having the plurality of zig-zag corrugations is greater than if the trace did not include the plurality of corrugations in a direction that is parallel to the axis of orientation of the plurality of zig-zag corrugations.

4. The disk drive according to claim 2, wherein the zig-zag shape comprises changes in vertical positions of the trace relative to a horizontal plane defined by the gimbal.

5. The disk drive according to claim 4, wherein the zig-zag shape further includes changes in the horizontal positions of the trace in a direction orthogonal to an overall direction of travel of the trace.

6. The disk drive according to claim 5, wherein the changes in the horizontal positions of the trace define a generally repeating pattern of back-and-forth changes without crossing over or under any other traces.

7. The disk drive according to claim 4, wherein the changes in the vertical positions of the trace define a generally repeating pattern of back-and-forth changes in the vertical positions of the trace without crossing over or under any other traces.

8. The disk drive gimbal according to claim 1, wherein:
   a. the trace is made of a conducting material; and
   b. the zig-zag shape is configured to provide a level of stress relief to the conducting material that is included in the trace.

9. The disk drive gimbal according to claim 1, wherein:
   a. the trace has a height from approximately 5 μm to approximately 20 μm; and
   b. the trace has a width from approximately 10 μm to approximately 100 μm.

10. The disk drive gimbal according to claim 1, wherein the trace includes a section that has a shape that is selected from the group consisting of straight, angled, and curved.

11. The disk drive gimbal according to claim 1, wherein the strut further includes:
    a. an insulating layer having a first surface; and
    b. a conducting layer that is coupled to the insulating layer's first surface and included in the trace.

12. The disk drive gimbal according to claim 11, wherein:
    a. the insulating layer has a second surface; and
    b. the strut further includes a supporting layer that is coupled to the insulating layer's second surface.

13. The disk drive gimbal according to claim 12, wherein:
    a. the conducting layer is made of a conducting material selected from the group consisting of deposited copper and deposited copper alloy;
    b. the insulating layer is made of polyimide; and
    c. the supporting layer is made of stainless steel.

14. The disk drive gimbal according to claim 1, wherein:
    a. the strut includes a plurality of traces; and
    b. at least one of the plurality of traces has the zig-zag shape.

15. The disk drive gimbal according to claim 14, wherein:
    a. each of the plurality of traces has a trace width; and
    b. the plurality of traces are separated from one another by a distance from approximately the trace width to approximately twice the trace width.

16. A disk drive gimbal comprising:
    a. a strut that includes a trace, the trace having a zig-zag shape and a width; and b. wherein the trace's zig-zag shape includes a repetitive oscillatory shape that can be characterized as having a wavelength from approximately one half the width of the trace to approximately four times the width of the trace.

17. The disk drive gimbal comprising:
a. a strut that includes a trace and an insulating layer having a surface and a maximum thickness;
b. wherein the trace is coupled to the insulating layer's surface; and
c. wherein the trace has a zip-zag shape, the trace's zig-zag shape including a repetitive oscillatory shape that can be characterized as having an amplitude from approximately one third of the insulating layer's maximum thickness to approximately three fourths of the insulating layer's maximum thickness.

18. An apparatus comprising:
a. a trace that is made of a conducting material;
b. wherein:
  i. the trace has a primary direction of travel line, and further has a zig-zag shape, the zig-zag shape being defined at least in part by the trace having, in the following sequence:
    a first section that lies at least partially on said primary direction of travel line;
    a second section that deviates away from said line;
    a third section that converges back toward said line; and
    a fourth section that lies on said line;
    the first, second, third, and fourth sections all being located within an area in which the trace does not cross over or under any other traces carrying electrical signals; and
  ii. the zig-zag shape is configured to provide a level of stress relief to the conducting material that is included in the trace.

19. The apparatus according to claim 18, wherein:
a. the trace includes a plurality of zig-zag corrugations;
b. the apparatus has a stiffness; and
c. the stiffness of the apparatus with the trace having the plurality of zig-zag corrugations is greater than if the trace did not include the plurality of zig-zag corrugations.

20. The apparatus according to claim 19, wherein:
a. the plurality of zig-zag corrugations have an orientation along an axis; and
b. the stiffness of the apparatus with the trace having the plurality of zig-zag corrugations is greater than if the trace did not include the plurality of zig-zag corrugations in a direction that is parallel to the axis of orientation of the plurality of corrugations.

21. The apparatus according to claim 18, further comprising an insulating layer having a surface, wherein the trace is coupled to the insulating layer's surface.

22. The apparatus according to claim 18, further comprising an insulating layer having a surface, wherein the trace is coupled to the insulating layer's surface.

23. The apparatus according to claim 18, wherein:
a. the trace has a width; and
b. the trace's zig-zag shape includes a repetitive oscillatory shape that can be characterized as having a wavelength from approximately one half the width of the trace to approximately four times the width of the trace.

24. The apparatus according to claim 18, wherein:
a. the apparatus further includes an insulating layer having a surface and a maximum thickness;
b. the trace is coupled to the insulating layer's surface; and
c. the trace's zig-zag shape includes a repetitive oscillatory shape that can be characterized as having an amplitude from approximately one third of the insulating layer's maximum thickness to approximately three fourths of the insulating layer's maximum thickness.

25. The apparatus according to claim 18, wherein:
a. the trace is included as one of a plurality of traces; and
b. at least one of the plurality of traces has the zig-zag shape.

26. The disk drive according to claim 18, wherein the zig-zag shape comprises changes in vertical positions of the trace relative to a horizontal plane defined by the gimbal.

27. The disk drive according to claim 26, wherein the zig-zag shape further includes changes in the horizontal positions of the trace in a direction orthogonal to an overall direction of travel of the trace.

28. The disk drive according to claim 27, wherein the changes in the horizontal positions of the trace define a generally repeating pattern of back-and-forth changes without crossing over or under any other traces.

29. The disk drive according to claim 26, wherein the changes in the vertical positions of the trace define a generally repeating pattern of back-and-forth changes in the vertical positions of the trace without crossing over or under any other traces.

* * * * *